United States Patent [19]

Okada et al.

[11] Patent Number: 4,526,106
[45] Date of Patent: Jul. 2, 1985

[54] THREE-WHEELED ADJUSTABLE VEHICLE

[75] Inventors: Tokuji Okada; Takeo Kanade, both of Pittsburgh, Pa.

[73] Assignee: Carnegie-Mellon University, Pittsburgh, Pa.

[21] Appl. No.: 540,179

[22] Filed: Oct. 11, 1983

[51] Int. Cl.³ .............................................. B61B 13/10
[52] U.S. Cl. ................................ 104/138 G; 105/365; 250/358.1; 378/60
[58] Field of Search .............. 104/138 R, 138 G, 155; 105/365; 378/60; 250/358.1; 15/104.03, 104.05, 104.3 R; 33/1 H, 178 F; 73/40, 405 R, 405 A; 134/166 C, 167 C, 168 C, 169 C; 254/134.5, 134.3 FT; 118/105, 254, 306, 317, 408, 622, DIG. 10; 72/466

[56] References Cited

U.S. PATENT DOCUMENTS

| 2,897,779 | 8/1959 | Perkins | 15/104.05 X |
| 3,044,749 | 7/1962 | Dilday | 254/134.5 |
| 3,064,127 | 11/1962 | Green et al. | 73/40.5 R X |

Primary Examiner—Randolph A. Reese
Attorney, Agent, or Firm—Buell, Ziesenheim, Beck & Alstadt

[57] ABSTRACT

A motor driven vehicle for traversing the interior of a pipe or conduit comprises a pair of arms pivoted to each other at one pair of ends, a drive wheel the axle of which may coincide with the pivot, a swiveling wheel carried at the other end of each arm and a spring positioned to pull the arms toward each other so that the dimension of the vehicle across a pipe is automatically maximized. The vehicle thus tends to position itself on the longest axis of any cross section of the pipe. The drive wheel may be constructed with rim segments which rotate about axes tangent to the means circumference of the rim.

7 Claims, 7 Drawing Figures

THREE-WHEELED ADJUSTABLE VEHICLE

This invention relates to a vehicle for traversing the interior of long pipes or conduits. It is more particularly concerned with self-propelled apparatus that adjusts itself to the shape of pipe not truly circular and to the size of the pipe.

BACKGROUND OF THE INVENTION

It is necessary to make periodic inspections of the interior of pipe and conduits carrying hazardous fluids and other fluids leakage of which cannot be tolerated. Pipes and conduits of appropriate size have been inspected by various types of devices which travel or are propelled through the pipes, carrying cameras or other inspection devices. It is not unduly difficult to design such a vehicle for a truly circular pipe of fixed diameter as it can propel itself by traction along geometrically opposite areas of the pipe wall. However, ideal conditions are seldom found in pipe lines and conduits, particularly at bends. Furthermore prior art vehicles have difficulty maintaining traction on inclined surfaces against the pull of gravity.

SUMMARY OF THE INVENTION

Our vehicle to be described in detail hereinafter accommodates itself to variations in the interior contour of the pipe and automatically positions itself on the longest axis of any cross-section of the pipe. It comprises a pair of arms pivoted to each other at one pair of ends and a drive wheel, the axle of which may coincide with the pivot. The other end of each arm carries a swiveling wheel, and a spring or like device to pull the arms toward each other so that the dimension of our device across the pipe is maximized. Our drive wheel structure facilitates movement of the wheel sidewise, so enhancing the ability of the vehicle to position itself for maximum traction.

DESCRIPTION OF PREFERRED EMBODIMENT

Figure 1:
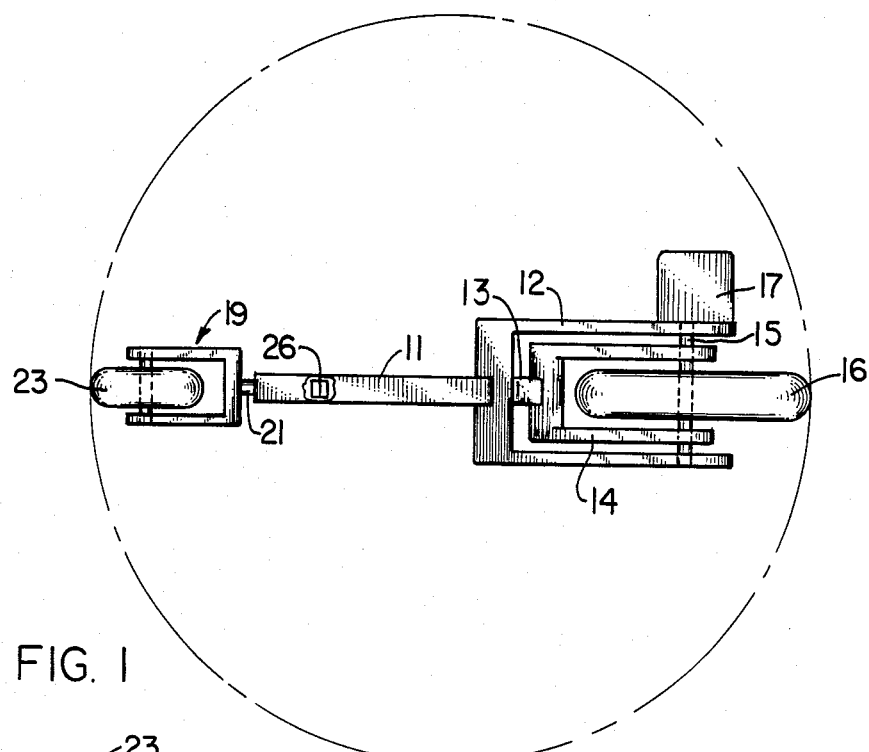
FIG. 1 is a view of apparatus of our invention taken crosswise of a pipe.
Figure 2:
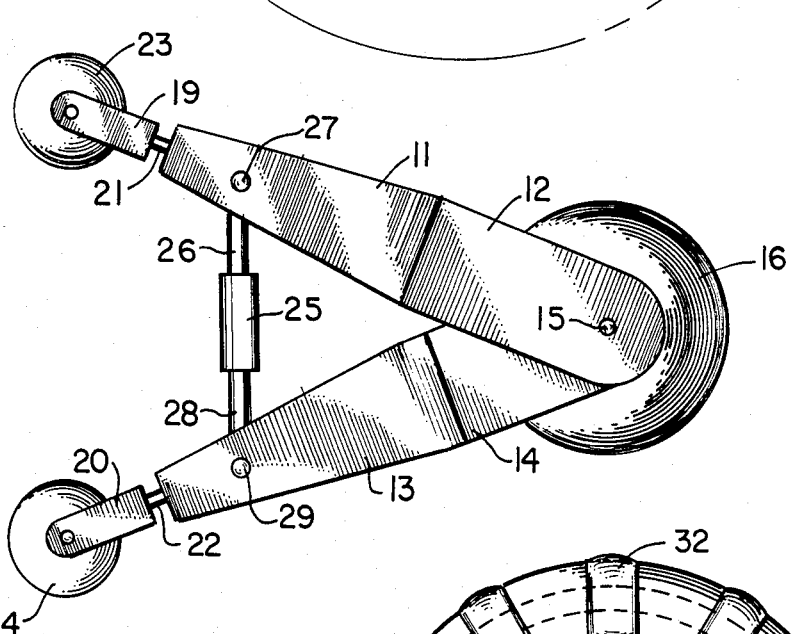
FIG. 2 is an elevation of the apparatus of FIG. 1.

The basic embodiment of our vehicle is shown in FIGS. 1 and 2. Arm 11 carries a clevis 12 at one end and arm 13, of length equal to arm 11, carries a clevis 14 at its corresponding end, clevis 14 being dimensioned to fit inside clevis 12. A shaft or axle 15 is journaled in the outer ends of both clevises, so allowing arms 11 and 13 to pivot thereabout, and carries drive wheel 16 between the forks of the clevises. An outboard motor 17 affixed to clevis 12 drives shaft 15. At the other end of arm 11 a clevis 19 is mounted on a shaft 21 so as to swivel thereabout and carries a freely rotating wheel 23. The other end of arm 13 also terminates in a clevis 20 mounted for swiveling on a shaft 22 and carries a freely rotating wheel 24. Between arms 11 and 13 is attached a tension spring 25, one end 26 of which is fixed to a pin 27 in arm 11 and the other end 28 of which is fixed to a pin 29 in arm 13.

Figure 3:
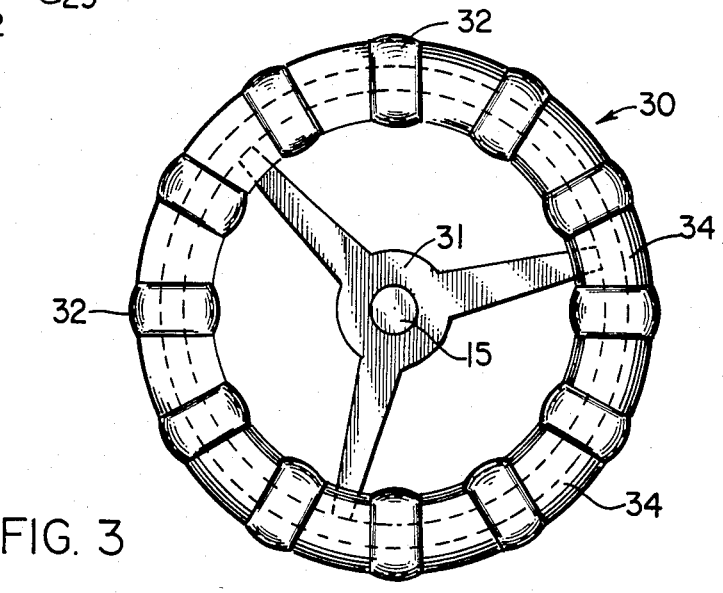
FIG. 3 is an elevation of the drive wheel of our apparatus shown in more detail.
Figure 4:
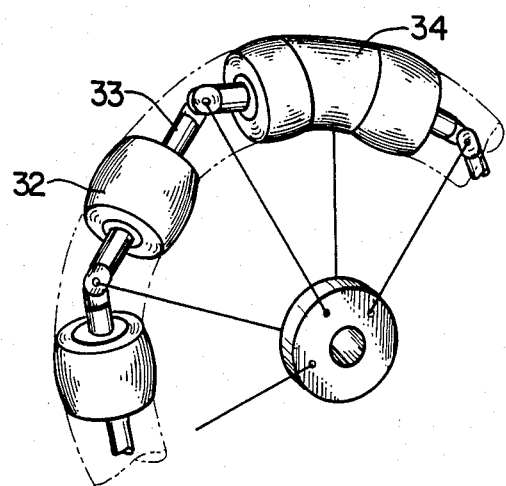
FIG. 4 is a cut-away detail of the wheel of FIG. 3 showing the structure of the wheel rim.
Figure 5:
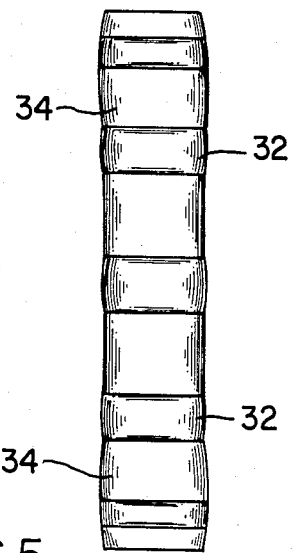
FIG. 5 is an end elevation of the wheel of FIG. 3.

The drive wheel 16 of our vehicle is shown in detail in FIGS. 3, 4 and 5. It comprises a rim 30 and a spider 31 having shaft 15 at its center. Rim 30 consists of a series of rollers 32 each of which rotates freely about its shaft 33. Shafts 33 of successive rollers 32 are joined at their ends, as is best shown in FIG. 4. The space between the ends of adjoining rollers 32 is filled by spacers 34 which surround the joined ends of shafts 33 and, of course, do not rotate. Shafts 33 are tangent to the median circumference of rim 30. Freely rotating rollers 32 allow drive wheel 16 to move normal to its plane but do not impair its traction in that plane.

In operation our apparatus is placed in a pipe crosswise thereof, the outline of the pipe being shown in broken lines in FIG. 1. That outline is not necessarily circular. To place our vehicle in the pipe, arms 11 and 13 are pulled apart the necessary amount. Spring 25 tends to pull arms 11 and 13 toward each other, which pushes drive wheel 16 against the opposite side of the pipe. Motor 17 is then started, rotating drive wheel 16, and moving our vehicle along the pipe. If wheel 16 is not normal to a plane tangent to the pipe at the point of wheel contact, wheel 16 will tend to move sidewise on rollers 32 and wheel 23 and 24 will swivel on their shafts 21 and 22 so that they move in the direction of drive wheel 16. If there is any change in the distance between the portions of the pipe wall against which the wheel 16 and wheels 23 and 24 press the angle between arms 11 and 13 will change, the result of the movements above described being that our vehicle will move along the pipe aligned with the longest axis of the cross section of that region of the pipe in which it is located. Because of this automatic adjustment capability, our vehicle can move up or down an incline without difficulty.

Figure 6:
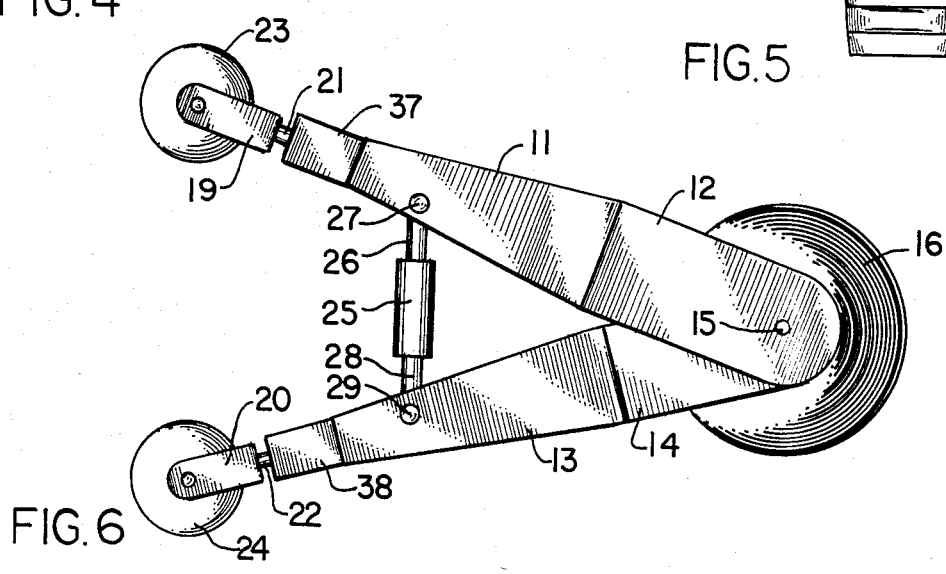
FIG. 6 is an elevation of a second embodiment of our invention.

Another embodiment of our vehicle is shown schematically in FIG. 6. The components which are identical to those of FIGS. 1 through 5 carry the same reference characters. The only difference between this embodiment and our first embodiment is that in our first embodiment arms 11 and 13 are of fixed length whereas in the embodiment of FIG. 6 arm 11 has an extension device 37 interposed between its lower end and swivel shaft 21 and arm 13 has a like device 38 interposed between its lower end and shaft 22. Devices 37 and 38 are adjustable so that the vehicle dimensions can be adjusted for pipes and conduits of a range of sizes.

Figure 7:
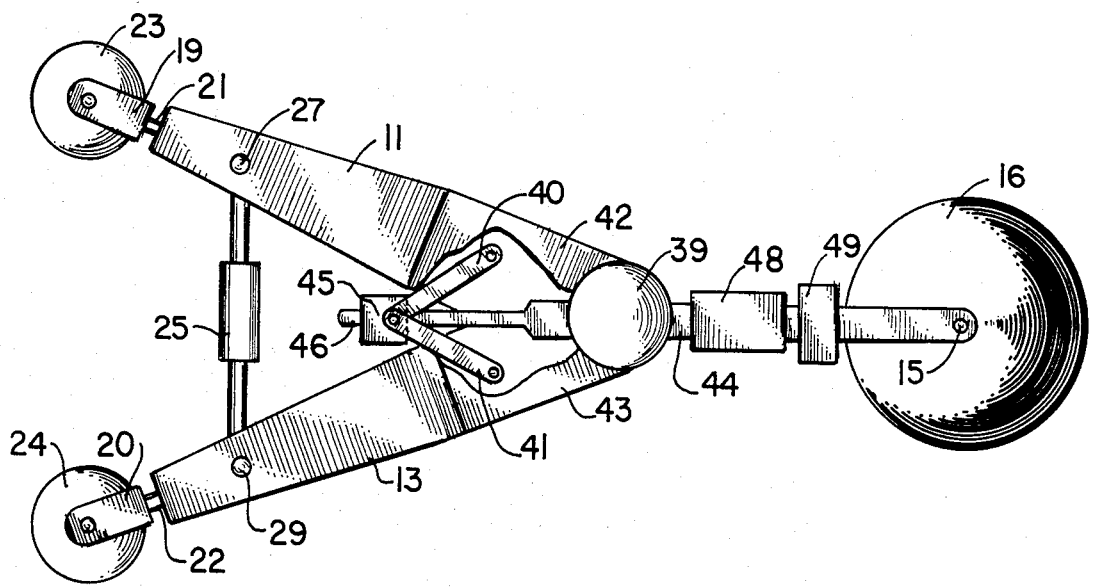
FIG. 7 is an elevation, partly broken away, of a third embodiment of our invention.

Still another embodiment of our device is illustrated in FIG. 7 which is a modification of the vehicle of FIG. 1. The joined ends of arms 11 and 13 are pivotally connected in junction 39 through which extends member 44. Links 40 and 41 pivotally connected at their junction 45 are pivotally connected to arms 11 and 13 respectively so that section 42 of arm 11, between the pivot point of link 40 and junction 39, is equal in length to section 43 of arm 13 between pivot point of link 41 and junction 39. The inside end 46 of member 44 passes through an opening in junction 45 between links 40 and 41. The outer end of member 44 carries a drive wheel which may be drive wheel 16. Member 44 of our invention has an extension device 48 interposed between junction 39 and drive wheel 16. In operation the four-link arrangement 40, 41, 42 and 43 maintains member 44 on the line bisecting the angle between arms 11 and 12. Extension device 48 permits adjustment of the length of member 44 so that our vehicle of FIG. 7 is adapted for use over a range of pipe sizes. Member 44 may also include a steering device 49 which is capable of rotating the axle of drive wheel 16 about the longitudinal center line of member 44 so as to steer our vehicle. When the steering device is a part of our vehicle shown in FIG. 7 the drive wheel 16 need not be the type of wheel shown in FIGS. 3, 4 and 5, but in the absence of steering device 49 drive wheel 16 is of the type shown in FIGS. 3, 4 and 5.

In the foregoing specification we have described a presently preferred embodiment of our invention; however, it will be understood that our invention can be otherwise embodied within the scope of the following claims.

We claim:

1. A vehicle for automatically following the center line of a pipe comprising a pair of arms connected at one pair of ends about a pivot, a driving wheel mounted to rotate about an axle at the pivoted ends of said arms in the plane of said arms, a swiveling wheel mounted at the free end of each arm, and means connected between the arms urging them to pivot towards each other.

2. The vehicle of claim 1 in which the arms are of equal length.

3. The vehicle of claim 1 including means for telescoping the arms.

4. The vehicle of claim 1 in which the driving wheel axle comprises the pivot at one pair of ends.

5. The vehicle of claim 1 including a member passing through said pivot and extending toward and away from said swiveling wheels, links connecting the ends of said member extending toward said swiveling wheels with said pair of arms so as to cause said member to bisect the angle between said arms, and in which said axle is carried by the end of said member extending away from said swiveling wheels spaced from said pivot.

6. The vehicle of claim 5 including means for rotating said axle about the longitudinal center line of said member.

7. The vehicle of claims 1, 2, 3, 4 or 5 in which the driving wheel has a rim including segments which rotate freely about axes tangent to the median circumference of the rim.

* * * * *